(12) United States Patent
Gerzeny et al.

(10) Patent No.: US 6,782,623 B1
(45) Date of Patent: Aug. 31, 2004

(54) BODY MOUTING SYSTEM

(75) Inventors: David R. Gerzeny, Sarasota, FL (US); Steven B. Gerzeny, Venice, FL (US); Matt L. Gerzeny, Nokomis, FL (US); Ronald R. Frank, Sarasota, FL (US)

(73) Assignee: Coach House, Inc., Nokomis, FL (US)

( * ) Notice: Subject to any disclaimer, the term of this patent is extended or adjusted under 35 U.S.C. 154(b) by 0 days.

(21) Appl. No.: 10/395,739

(22) Filed: Mar. 24, 2003

Related U.S. Application Data

(60) Provisional application No. 60/367,872, filed on Mar. 28, 2002.

(51) Int. Cl.$^7$ ................................................ B21D 53/88
(52) U.S. Cl. ........................ 29/897.2; 29/401.1; 29/458; 296/164; 296/197
(58) Field of Search ................................ 29/897, 897.2, 29/897.312, 898.07, 428, 458, 459, 469, 525.01, 527.2, 401.1; 296/164, 197, 29, 31, 31 P; 52/282, 631

(56) References Cited

U.S. PATENT DOCUMENTS

| | | | | |
|---|---|---|---|---|
| 4,542,933 A | * | 9/1985 | Bischoff | 296/164 |
| 4,837,914 A | * | 6/1989 | Borum et al. | 29/401.1 |
| 4,974,377 A | * | 12/1990 | Dominitz et al. | 52/143 |
| 5,305,512 A | * | 4/1994 | Ward | 29/401.1 |
| 6,368,008 B1 | * | 4/2002 | Biernat et al. | 403/267 |
| 6,662,424 B2 | * | 12/2003 | Ehrlich | 29/525.01 |

* cited by examiner

*Primary Examiner*—David P. Bryant
*Assistant Examiner*—Stephen Kenny
(74) *Attorney, Agent, or Firm*—Gifford, Krass, Groh, Sprinkle, Anderson & Citkowski, PC

(57) ABSTRACT

A motor home recreational vehicle having a unitary body structure and method of mounting the vehicle in which the body structure is provided with mounting members that are bonded to the interior of the body with an adhesive to eliminate fasteners exposed at the exterior of the vehicle. The mounting members are attached to vehicle frame portions at the interior of the body structure to securely fasten the body structure and vehicle portion together.

6 Claims, 3 Drawing Sheets

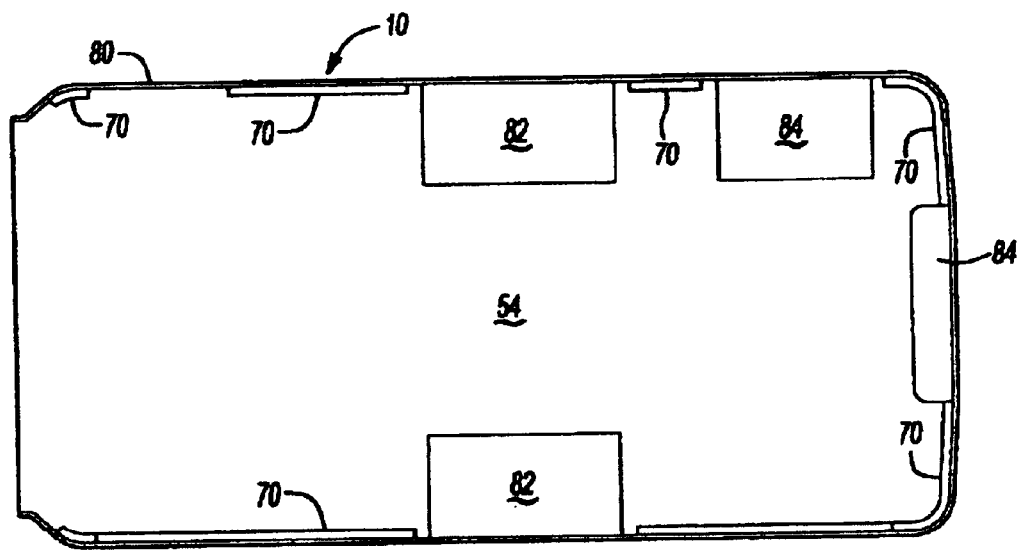
*Fig-6*
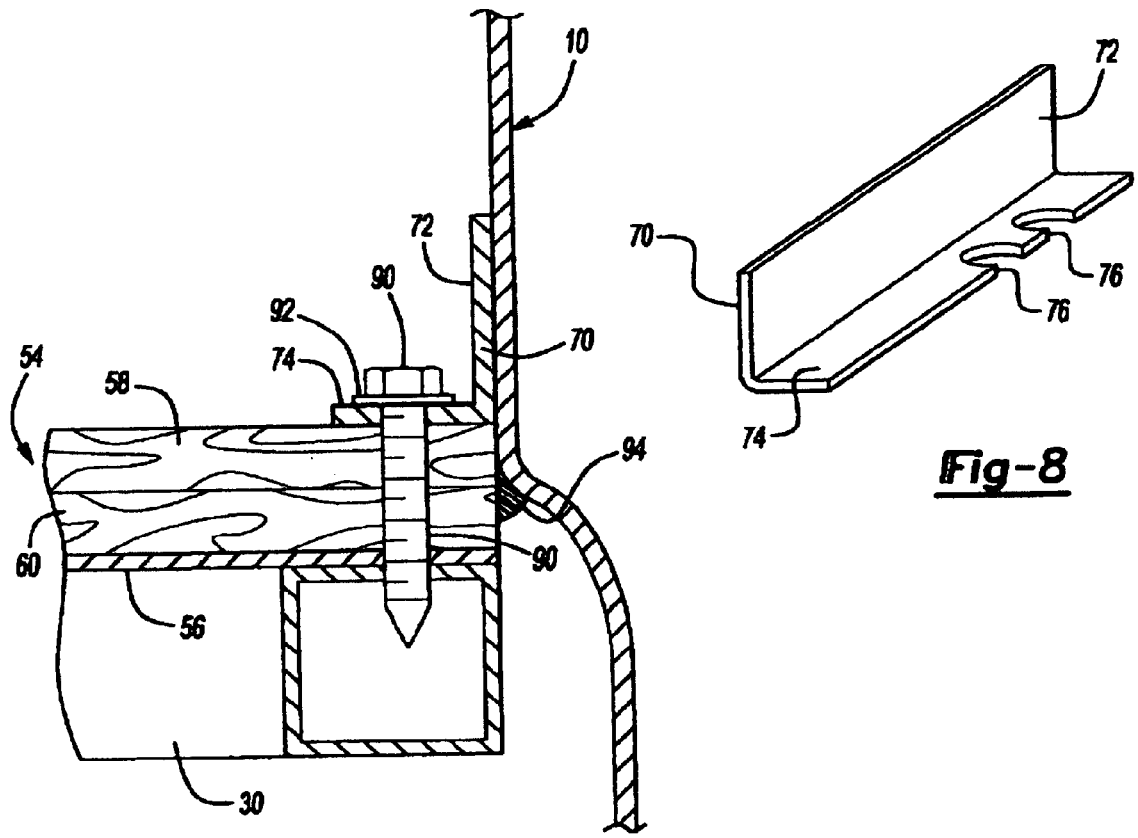
*Fig-7*
*Fig-8*

BODY MOUTING SYSTEM

REFERENCE TO RELATED APPLICATION

This application claims priority from U.S. Provisional Patent Application Ser. No. 60/367,872, filed Mar. 28, 2002, the entire content of which is incorporated herein by reference.

FIELD OF THE INVENTION

This invention relates to vehicles of the motor home type and more particularly to motor home bodies and their attachment to the suspended frame of a vehicle.

BACKGROUND OF THE INVENTION

Vehicle bodies for recreational vehicles such as motor homes typically are made of panels that are attached to a floor assembly which in turn is fastened to the subframe that is cushioned relative to the mainframe of the vehicle. The fastening means for bodies and panels of bodies typically are mechanical fasteners. Some of such fasteners usually are visible at the exterior of the vehicle and no matter how carefully arranged, are unattractive. Attempts to conceal such fasteners with decorative trim strips and covering panels require additional expense and cost and in the end are a possible point of early deterioration requiring maintenance and repair.

Some attempts have been made to conceal the fastening system by mounting members on the interior of body members by using resin and fiberglass tape or cloth acting through perforations in the mounting members to join with the body portions. Such attempts, however, have not been satisfactory because unless great care is used the connection is made with resin alone without the benefit of fiberglass reinforcement.

It is desirable in the manufacture of motor homes to have a mounting system to facilitate the attachment of a unitized body to a vehicle so that the fasteners are concealed and do not mar the exterior apperance or form a weak point for deterioration of the vehicle.

SUMMARY OF THE INVENTION

It is an object of the invention to provide a support structure method of attaching a unitized body structure to the suspended floor of a motor vehicle.

Another object is to provide a mounting structure and method of attaching a unitized body to a partially completed vehicle in which the fastening means are concealed from the exterior of the vehicle.

Still another object is to provide a mounting structure for joining a body to a vehicle which is reliable and easy to use.

The objects of the invention are attained by having a motor home vehicle with a vehicle portion including a frame suspended from ground engaging wheels and having a vehicle cab with an open rearward end portion and a floor extending rearwardly from the cab to receive a body portion. The body portion is a unit of fiberglass reinforced resin having an open forward portion for joining to the cab at its open rearward end portion and an open bottom portion to cover the floor extending from the cab. The body and vehicle are joined together by mounting members having vertically and horizontally extending portions for engaging the interior surface of the body and the top surface of the floor, respectively. The vertically extending portions are attached permanently to the interior body surface with an adhesive and more particularly a methacrylate adhesive and the horizontally extending portions are attached to the top surface of the floor by a plurality of mechanical fasteners which are not visible from the exterior of the body.

DESCRIPTION OF THE DRAWINGS

FIG. 6 is a cross-sectional view taken on line 6—6 in FIG. 1;

FIG. 7 is cross-sectional view at an enlarged scale of a portion of the body and floor along line 7—7 in FIG. 1; and FIG. 8 is a perspective view at an enlarged scale of a component used to join the body and vehicle.

DETAILED DESCRIPTION

Figure 1:
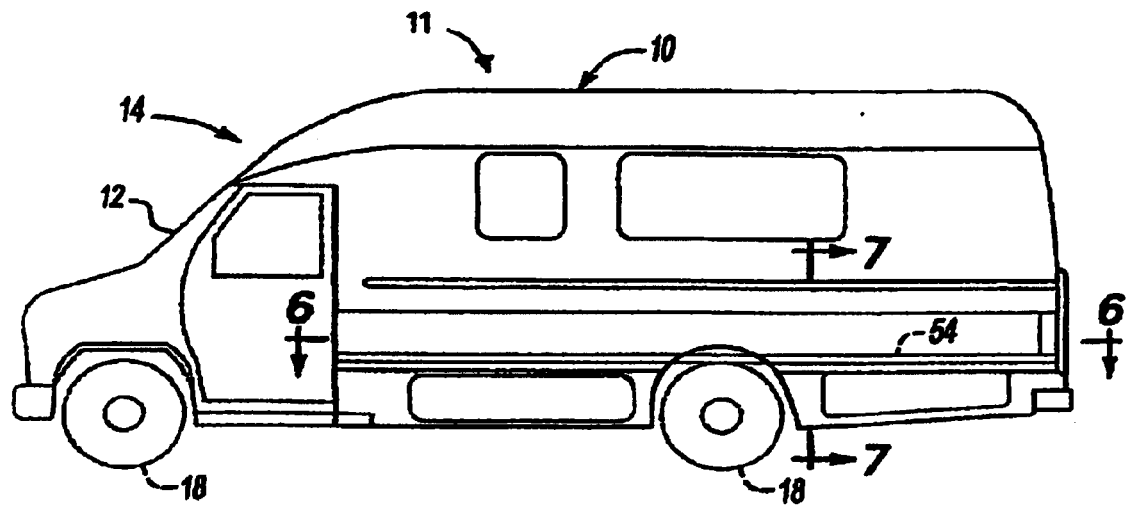
FIG. 1 is a side elevation showing a recreational vehicle with the body portion in full lines and the vehicle portion in dash lines as seen from the drivers side or left side of the vehicle.

Referring to the drawings, the invention is concerned with the mounting of a body 10 of a recreational vehicle such as a motor home 11 to the cab 12 of a vehicle such as a truck 14. The body 10 is intended to contain the living quarters such as beds, bathroom and kitchen facilities. The truck portion 14 of the vehicle includes a frame 16 (seen in FIG. 3) supporting the cab 12 with the usual driver seat and a passenger seat. The cab 12 of the truck 14 is open at its rear and the body portion 10 is open at its front so that when the cab 12 and body 10 are joined and fastened together, they form an integral body of the motor home 11 with a single space or cavity for occupants.

Figure 2:
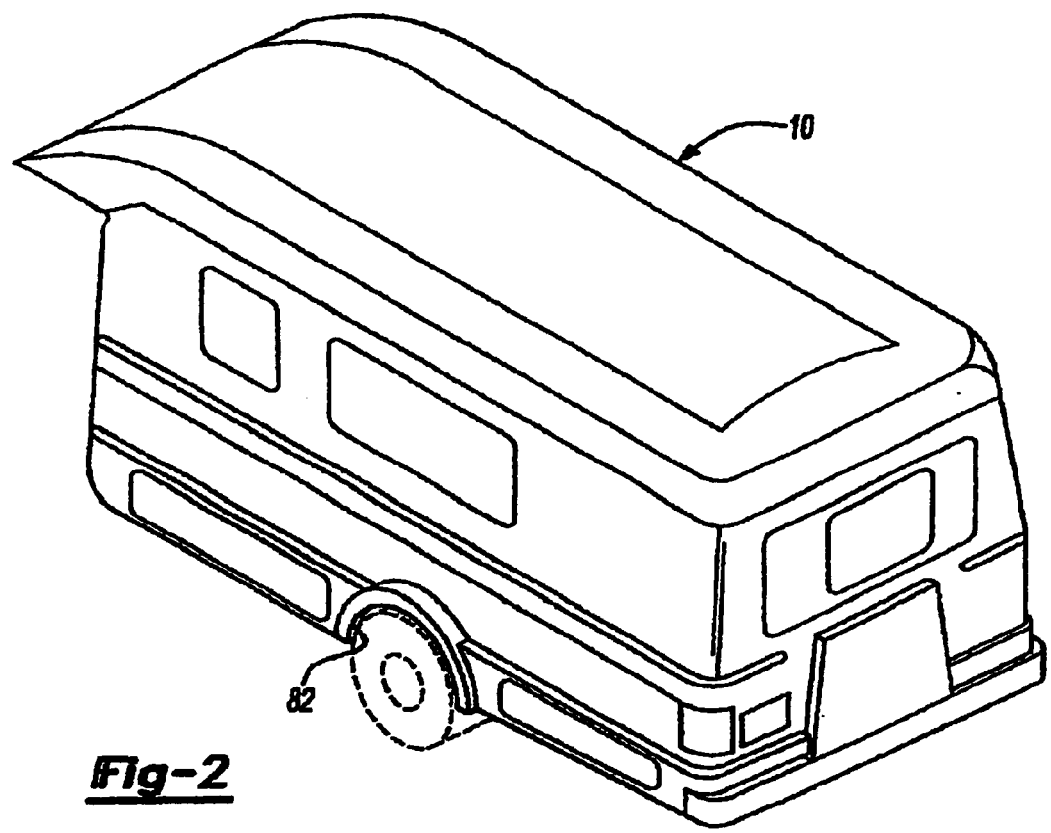
FIG. 2 is a perspective view of the vehicle body alone taken from the upper and right rear.

Although the body portion 10 can be made of panels joined together, in the preferred embodiment of the invention, the body portion is a unitary body made of resin-reinforced fiberglass as seen separately from the vehicle in FIG. 2.

The truck portion 14 of the recreational vehicle includes the entire main frame 16 supported from the ground engaging wheels 18, the engine and drive train (not shown) and the cab 12 with controls and seats (not shown).

Figure 3:
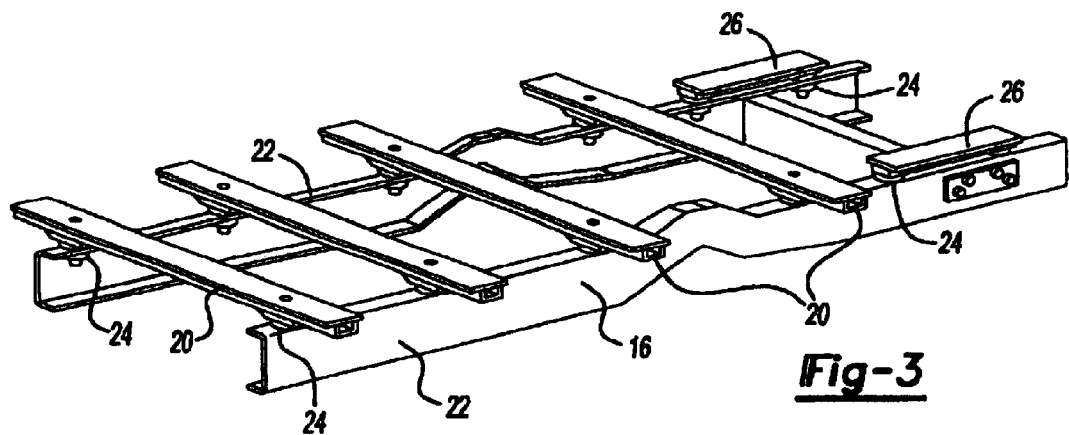
FIG. 3 is a perspective view of a portion of a vehicle frame for supporting the body portion of a recreational vehicle.

The truck frame 16 of the truck portion 14 is provided with cross-members 20 as seen in FIG. 3 which are supported to extend transversely of longitudinal frame stringers 22. Each of the cross members 20 has opposite end portions supported to the frame stringers 22 by means of resilient mounting structures indicated at 24. In addition to the cross-members 20 the frame 16 is provided with a pair of longitudinally extending members 26 mounted to extend longitudinally parallel to the end portion of the frame 16. The frame members 26 are supported in the same manner as the frame cross-members 20, that is, by resilient supports 24.

Figure 4:
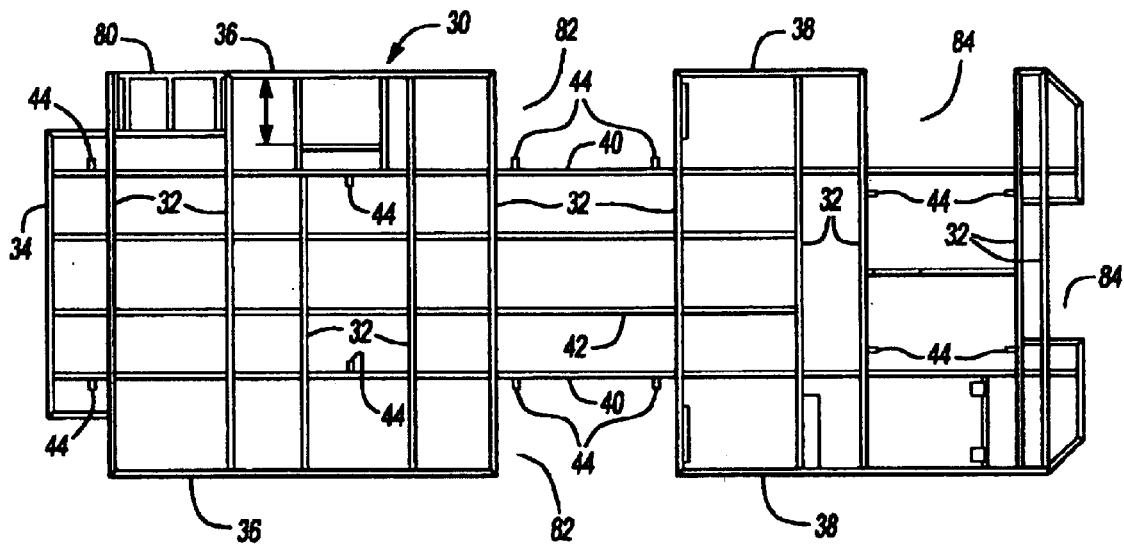
FIG. 4 is a top plan view of a subframe which is mounted on the frame of the vehicle shown in FIG. 3.

The cross-members 20 and longitudinal members 26 are used to support a subframe 30 forming part of the floor structure of the motor home 11. The subframe 30 is made up of tubular metal having a square cross-section of about 1½ inches on a side. The various tubular members are welded together to form a grid with all of the members in the same plane. As seen in FIG. 4, subframe 30 includes ten transverse members 32 spaced apart in parallel relationship to each other and a forward shorter transverse member 34. The transverse members 32 are joined together by opposed perimeter members 36 and 38. The various longitudinal members 40, 42 are formed of separate sections welded together and to the various transverse members 32 and 34.

Figure 5:
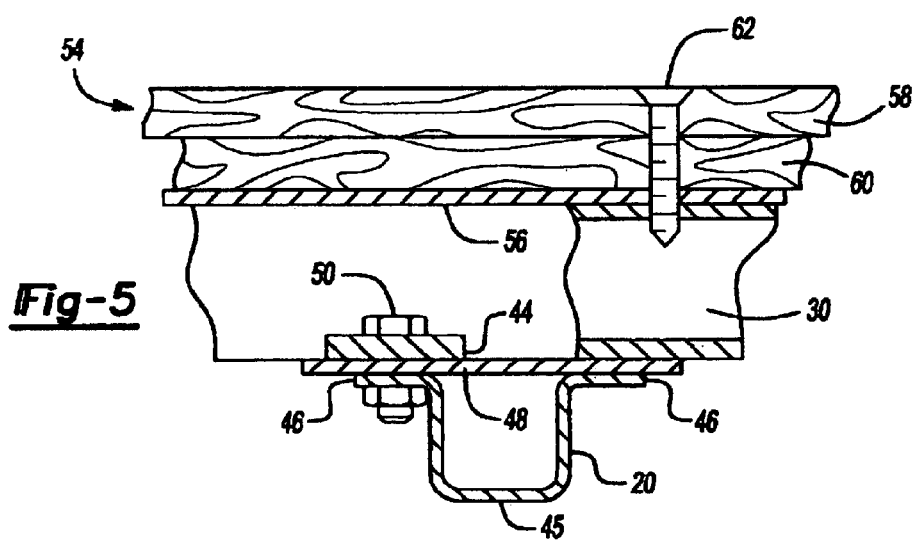
FIG. 5 is a view at an enlarged scale and with parts broken away showing how the subframe of FIG. 4 is attached to the vehicle frame of FIG. 3 and how the floor is attached to the subframe.

The subframe 30 is provided with tabs 44 which are welded to the sides of subframe members and are used to fasten the subframe 30 to the cross-members 20. For example, the tabs 44 at the left end of the subframe 30 in FIG. 4 are connected to the first cross-member 20 at the left side of FIG. 3. Similarly, the remaining pairs of tabs 44 are attached to the remaining transverse members and the longitudinal stringers 26 in the manner seen in FIG. 5. As seen in FIG. 5, the cross members 20 are made up of a channel shaped member 45 having opposed outwardly extending flanges 46. The channel portion 45 and the flanges 46 are covered with a top plate 48 that is welded as an integral unit to form the cross members 20. The various tabs 44 of the subframe 30 are aligned with one or the other of the flanges 46 of the cross members 20 so that the tabs 44 can be fastened to the cross members 20 with fastening means such as bolts 50.

With this mounting system the subframe 30 and cross-members 20 and longitudinal stringers 26 are supported in resilient or cushioned relationship to the main frame 16 of the vehicle 14.

The subframe 30 supports the floor panel 54 of the body portion 10 of the motor home 11. The floor panel 54 comprises a first layer 56 of sheet metal such as aluminum which in turn is covered by two one-half inch layers of laminated wood or plywood 58 and 60. The various layers 56, 58 and 60 are provided with an adhesive between each adjacent layer and the entire structure 54. Also a layer of urethane sealant such as Bostik Sealer Adhesive 920 is applied to the top surface of the entire subframe 30 seen in FIG. 4 prior to laying of the floor panel 54 on the subframe. Thereafter, the floor panel is fastened to the subframe 30 by means of self-tapping screws 62 which pass through the two layers of floor paneling 58 and 60 and sheet metal layer 56 as well as the top wall of the one and one-half inch square tubular steel members forming the subframe 30. The screws 62 are located on 12-inch centers over the entire subframe 30. When completed the floor panel 54 and subframe 30 form a strong support for the mounting of the body 10 of the motor home 11.

The subframe 30 covered with the floor panel 54 has the general configuration seen in FIG. 6 when viewed from above. Since this describes the interior floor of the vehicle it can be covered with various floor coverings such as vinyl or carpeting.

After the floor panel 54 has been mounted on the truck 14 or the vehicle portion of the motor home 11 is ready to receive the body 10. The body 10 is provided with body mounts 70 which are fastened in predetermined locations on the interior perimeter of the wall of the fiberglass body. The body mounts 70 are generally L-shaped with a vertical leg portion 72 and a relatively shorter horizontal leg portion 74. The horizontal leg portion 74 can be provided with notches 76 at selected locations to facilitate bending of the body mounts 70 to confirm to curvature such as those at the corners of the vehicle body 10 as seen in FIG. 6. Also, the angle between the legs 72 and 74 can be varied to accommodate variations in the side walls of body 10 relative the floor panel 54.

The flange members or body mounts 70 are cut to appropriate lengths and where necessary are bent to conform to the perimeter of the body 10. Excluded portions of the perimeter of the body 10 include the entry door area portion 80 indicated in FIG. 6, the wheel wells 82 and storage areas with access from the exterior and that might extend above and below the floor as indicated at 84. The areas 80, 82, 84 are indicated also in FIG. 4.

The body mounts 70 are attached to the interior surface of the body member 10 with an adhesive. To accomplish this an adhesive is applied to the entire outer surface of the vertical leg 72 of the L-shaped body mounts 70. With the entire outer surface of the vertical leg 76 covered with adhesive, it is pressed into abbutting relationship with the selected location on the interior wall of the body member 10 while the adhesive is allowed to cure. Preferably the adhesive is a two-part methacrylate adhesive. One such adhesive is available as Plexus AO 420 available through IPW Plexus Danvers, Massachusetts Mass. 01923. The methacrylate adhesive is of two parts and once mixed has a working time of only a few minutes for example, four to six minutes. Consequently, immediately after applying adhesive to the vertical leg 76 of the L-shaped body mounts 70 they are pressed against the body interior and held in that position for at least 15 to 18 minutes after which adhesive reaches its ultimate strength.

After all of the body mount strips 70 have been attached to their proper locations on the perimeter of the body interior as seen in FIG. 6, fiberglass body 10 can be moved into position over the floor 54 the truck 14 and lowered into position at the proper location with the horizontal leg 74 of the body mount 70 resting on the top surface of the floor 54 at its outer perimeter. Thereafter, with the body mounts 70 aligned to the proper location on the floor they are fastened to the floor 54 and subframe 30 with mechanical fasteners such as quarter inch lag screws 90 and washers 92 as seen in FIG. 7. Before placement of the lag screws 90, a pilot hole is drilled through the horizontal leg 74 of the body mounts 70 and the plywood panels 58 and 60, the metal pan 56 and through the upper wall the subframe portions at the perimeter, namely those located at 36 and 38 in FIG. 4. Thereafter, the lag screws 90, which can be of a self-tapping type are driven into position to pierce the various layers and finally the face of the cross-sectional member of the subframe 30 so that the body member 10 is joined not only to the floor 54, but also to the subframe of the vehicle.

After the body member 10 is secured in position, a urethane sealant is applied to any crevices between the body 10 and perimeter of the floor 54 as best seen at 94 in FIG. 7.

The mounting arrangement for the body 10 to the remainder of the truck 14 is completely on the interior of the walls of the body member 10 so that no fasteners of any kind are visible at the exterior of the motor home vehicle 11. The resulting mounting system provides a unitized vehicle body structure for a recreational vehicle.

Upon mounting of the body 10 to the vehicle, further steps can be taken in merging of the body 10 to the cab 12 so that the unitary body 10 and the cab 12 act as a unit and both are suspended by the same type of resilient mounting supports 24. Thereafter, provision of wheel well components, the adding of storage compartments and the installation of the interior such as the wiring and electric circuits, plumbing, interior decorative wall panels and furnishings can be performed.

A mounting system has been provided for making a recreational vehicle body integral with the frame and cab portion of a vehicle without the need for the exposure of mechanical fasteners by merging metal mounting with the interior walls of a fiberglass unitary body by the use of adhesive. Such a location of mounting means is completely concealed and not visible to detract from the vehicle appearance.

What is claimed is:

1. The method of joining a unitary body structure to a motor vehicle in which the vehicle includes a frame supported from ground engaging wheels and resiliently supports a cab from said frame, said cab having an open rearward portion and in which the body structure has an open forward portion complementary to the rearward open portion of said vehicle cab, the steps comprising:

resiliently mounting a metallic subframe on said frame of said vehicle;

mounting a floor panel on said subframe and integrally joining it to said cab to form a unitary structure therewith;

forming mounting members having wall and floor attaching portions;

cutting the mounting members to lengths conforming to selected interior portions of the body structure at the perimeter of the floor and at the floor level on said body structure;

coating a surface of said wall attaching portion of each of said mounting members with a two part methacrylate adhesive having a cure time of no more than about eighteen (18) minutes;

placing said adhesive coated wall attaching portion of each of said mounting members in abutting relation to said selected interior portions of said body structure and holding said mounting members in position until said adhesive is cured;

releasing said mounting members after said adhesive has cured;

aligning said body member and said mounting members with said floor with said floor attaching portions on the top surface of said floor;

fastening said floor attaching portions of said mounting members to said floor; and connecting said open rearward portion of said cab with said open forward portion of said body structure to form a unitary structure resiliently supported from the frame of said vehicle.

2. The method of claim 1 wherein selected ones of said mounting members are bent to conform to the shape of corresponding interior portions of said body structure.

3. The method of claim 1 wherein said floor panel is joined to said subframe by threaded fasteners passing through said floor and threadably engaging said subframe.

4. The method of claim 1 wherein a coating of sealer-adhesive is applied to the upper surface of said metallic subframe before said floor panel is mounted thereon.

5. The method of claim 1 wherein a sealant is applied at the juncture of the underside perimeter of said floor and the interior of said body structure.

6. The method of claim 5 wherein said sealant is a urethane sealant.

* * * * *